United States Patent Office 3,691,037
Patented Sept. 12, 1972

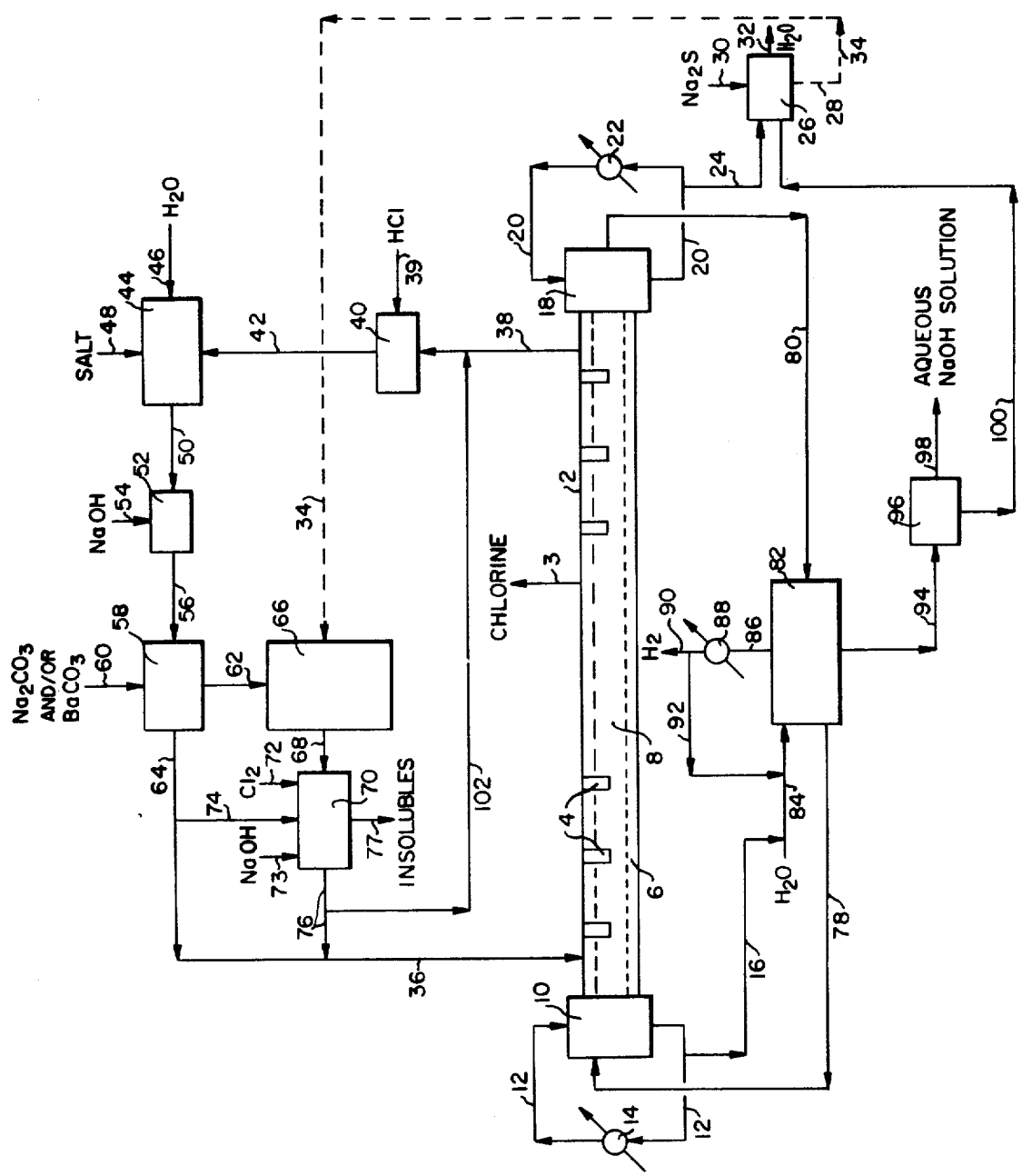

3,691,037
MERCURY RECOVERY FROM CHLORINE CELLS UTILIZING MERCURY CATHODES
Lionel Joe Updyke, Squamish, British Columbia, Canada, assignor to FMC Corporation, New York, N.Y.
Filed Mar. 25, 1971, Ser. No. 127,899
Int. Cl. B01k 1/00; C01d 1/08
U.S. Cl. 204—99                                9 Claims

ABSTRACT OF THE DISCLOSURE

In the process of producing chlorine and caustic from chlorine cells having mercury cathodes, liquid effluent streams unavoidably contain minor amounts of mercury. The mercury in these effluent streams is recovered in a simplified process by solubilizing it in a hypochlorite solution and reducing the dissolved mercury to elemental mercury in the chlorine cell.

BACKGROUND OF THE INVENTION

(A) Field of the invention

This invention relates to the production of chlorine and caustic from chlorine cells utilizing mercury cathodes and more particularly to the recovery of mercury from effluent streams of these chlorine cells.

(B) Description of the prior art

It is known that chlorine and caustic can be produced by electrolyzing brine in an electrolytic chemical cell utilizing mercury as the cathode. In this process a saturated brine solution is passed through an electrolytic chemical cell and electrolyzed within the cell by means of a series of anodes and a moving layer of mercury which is used as the cathode. Upon being electrolyzed, the brine yields elemental chlorine at the anodes and sodium at the cathode. The sodium immediately forms a sodium-mercury amalgam with the moving mercury cathode. The sodium-mercury amalgam is then passed to a decomposer and decomposed in the presence of water to yield a caustic soda solution and hydrogen. The mercury which is recovered by decomposition of sodium-mercury amalgam is recycled to the electrolytic chemical cell for continued use as the cathode. The saturated brine which is fed to the electrolytic chemical cell is obtained by dissolving salt in water, or in an aqueous solution such as recycled, depleted brine which has passed previously through the cell. The thus formed brine is purified to remove undesired metal cations, particularly iron, calcium and magnesium, and only then is passed into the cell for electrolysis and production of chlorine and caustic.

In the operation of the above process it is common to pass the effluent gas streams through condensers in order to remove any water and mercury which may be contained therein. This mercury is then recovered and returned to the electrolytic cell. However, mercury finds its way into the various aqueous streams used in the process and these streams must be processed to remove the mercury before they can be sewered. As a consequence, it is common to treat the effluent liquid streams with sodium sulfide. This treatment precipitates mercury as mercury sulfide, which is removed, prior to sewering the aqueous streams. This is most costly because of the large volumes of effluent that must be treated and the large treating tanks required for this purpose.

The precipitated mercury sulfide, in turn, must be recovered or be treated for recovery of mercury. One common method is to heat these mercury values in a sulfide roasting operation for recovery of volatilized mercury. While this roasting step can be quite efficient in the sense that the mercury loss during calcination is generally low, this roasting process has many drawbacks. Initially, it requires costly, specialized furnace equipment for roasting and recovering volatilized mercury. Other disadvantages include the recombination of liberated elements into mercuric sulfide, the unavoidable loss of mercury vapor as well as fine particles of condensed mercury from the system and the undesired pollution caused by $SO_2$ which is normally evolved during roasting.

As a result there is a need for a process whereby mercury values normally found in such effluent streams can be recovered easily and efficiently without the need for sulfide roasting ovens or other equipment specifically designed to recover mercury values from mercury sulfide or other mercury salts.

BRIEF DESCRIPTION OF THE DRAWING

The drawing illustrates a descriptive flow sheet of the present invention. The drawing illustrates an electrolytic cell, the mercury cycle for this cell and the brine cycle for the cell. Also shown are the mercury recovery stages for removal of mercury from effluent streams and the recovery of these mercury values.

BRIEF STATEMENT OF THE INVENTION

I have now found that mercury values which have been removed from aqueous streams, especially mercury salt precipitates, can be recovered by treating these mercury precipitates with an aqueous extracting solution containing hypochlorite ions in an amount sufficient to selectively solubilize the mercury values, separating the extract containing solubilized mercury values from insolubles, introducing this extract into an electrochemical cell along with the brine stream to said cell and removing from said electrochemical cell a depleted brine having a lower amount of mercury values than the brine entering said cell. The solubilized mercury values in said cell are converted to elemental mercury within the cell and returned to the moving mercury cathode at the base of said cell.

The invention contemplates the recovery of mercury values from precipitates obtained during the purification of the brine feed to the electrolytic cell as well as from precipitates obtained by treating effluent streams with sodium sulfide to precipitate mercuric sulfide from these effluent streams.

GENERAL DESCRIPTION OF THE INVENTION AND PREFERRED EMBODIMENTS

The present invention can best be described by reference to the attached drawing which illustrates the embodiments of the invention. In the drawing, a typical electrolytic cell 2 for producing chlorine and caustic solutions is described which is made up of anodes 4, a flowing mercury cathode layer 6 and a brine solution 8 which is to be electrolyzed. Conventional electrical equipment and the means for applying a potential between the anode and cathode are not shown in the drawing.

In the operation of electrolytic cell 2 a saturated brine solution enters the cell through conduit 36 and flows throughout the entire length of the cell until it exits through exit line 38. This solution is electrolyzed by passing current through the brine 8 between the anodes 4 and the moving cathode layer 6. In the electrolysis process, chlorine is evolved from the cell 2 through conduit 3 and is recovered as one of the products of the process.

During the electrolysis, sodium metal is also formed and immediately amalgamates with the mercury to form a sodium-mercury amalgam. This amalgam, along with elemental mercury, flows along the base of the cell 2 as the cathode layer 6 and passes through tail box 18 where it is washed by a continuous stream of water from conduit 20. The washed mercury is then removed through line 80 and flows to a decomposer 82. Water is also added to the decomposer 82 through line 84.

In the decomposer 82 the water and the sodium-mercury amalgam react to produce hydrogen and sodium hydroxide. The hydrogen is removed from the decomposer through line 86, passed through a cooler 88 in order to condense water, and any mercury that may be vaporized with the hydrogen. The condensed mercury and water are removed through line 92 and returned to the decomposer through line 84 while hydrogen gas is removed through line 90.

The elemental mercury that accumulates in decomposer 82 as the result of the decomposition of the sodium-mercury amalgam, and also from the continous flow of mercury through conduit 80, is then returned via conduit 78 through head box 10 to the electrolytic cell 2. The mercury in conduit 78 passes through head box 10 where it is washed by a continuous stream of water from conduit 12 prior to being returned to the electrolytic cell. A caustic soda solution, generally about 50% NaOH, is recovered from the decomposer 82 through line 94 and passed through a filter 96 where any impurities, including mercury, are removed. The resulting 50% caustic soda solution is then removed through line 98 as a product of the process.

Periodically, the filter 96, normally a carbon filter, is washed to remove adherent mercury, and such mercury-containing washings are removed through line 100 and passed to the precipitator 26 for recovery of mercury values.

The brine solution 36 which is fed to the cell 2 is made up in the following manner. The depleted brine solution from the electrolytic cell is removed through line 38 and passed into a dechlorinator 40 where the brine is treated with hydrochloric acid which is added through conduit 39. This acid treatment eliminates residual chlorine in the brine. The dechlorinated brine is then passed through conduit 42 into dissolver 44. Make-up water is added to the dissolver 44 through conduit 46 and salt is passed into the dissolver by conveying means 48. An impure, saturated brine is obtained and passed through line 50 into neutralizer 52 where it is treated with sodium hydroxide which enters neutralizer 52 through conduit 54.

In neutralizer 52 the saturated brine is increased to a pH of at least 7. During this treatment some magnesium impurities precipitate in the form of magnesium hydroxide, $Mg(OH)_2$. The resulting slurry is then passed through line 56 into precipitator 58. The slurry is further treated with barium carbonate and/or sodium carbonate which are added into the precipitator 58 through line 60. The barium carbonate reacts in the brine slurry with any sulfate and forms insoluble barium sulfate; the added sodium carbonate reacts with any calcium values in the saturated brine to form insoluble calcium carbonate. The precipitate is allowed to settle and then is removed through line 62 into holding tank 66 while the purified brine is removed through line 64, passed into conduit 36, and returned to the electrolytic cell 2.

In accordance with the present invention the precipitate in holding tank 66 is treated to recover mercury values. The precipitate is made up of insolubles such as iron hydroxide, iron sulfide, calcium carbonate, barium sulfate, insoluble mercury salts of various types, free mercury, graphite and all other types of impurities which are coprecipitated in the precipitator 58 and in neutralizer 52. The precipitate, which is in the form of a gelatinous sludge, is passed into mercury dissolving tank 70 through line 68 along with brine through line 74, and preferably purified brine which has been removed from precipitator 58 through line 64. In addition, chlorine is added through line 72 and sodium hydroxide is added through line 73 into the mercury dissolver 70.

The added brine, chlorine and sodium hydroxide react to form a solution of sodium hypochlorite, in which sodium chloride is normally present in greater than 1 molar quantities. The amount of chlorine and sodium hydroxide added is sufficient to maintain the resulting solution at a pH of about 7 or greater and preferably at a pH of 9 to 12. As a result of this treatment, the mercury values in the precipitate are converted to soluble mercury salts which selectively dissolve in the brine leaving the remaining impurities behind. The reactions for solubilizing insoluble mercuric salts, such as mercuric sulfide, or elemental mercury are set forth below:

(1) $HgS + 4(OCl)^- \rightarrow HgCl^= + SO_4^=$

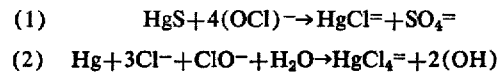

One method which has been found to improve the recovery of mercury from the precipitate is as follows. After brine, chlorine and caustic soda have been added to the precipitate in amounts sufficient to form a hypochlorite solution having a pH of at least 9 and some mercury values have been taken up by the solution, chlorine is then added in amounts sufficient to reduce the pH of the solution to between 7.0 and 8.0. This permits more mercury to be taken up by the hypochlorite solution, but, undesirably, some metal salt precipitates may also go into solution, albeit, at a slow rate. Thereafter, caustic soda is added to raise the pH to at least 9; this precipitates the metal salts that have dissolved in the hypochlorite solution, but not the soluble mercury values therein.

The mercury-free precipitate is removed through line 77 and discarded or used for landfill or other purposes. The supernatant brine containing the dissolved mercury values is removed from mercury dissolver 70 through line 76. This brine containing mercury ions can then be treated in either of two ways to remove residual hypochlorite values.

In the preferred embodiment the mercury-containing brine is conveyed through conduit 102 to the brine outlet conduit 38; residual sodium hypochlorite therein is contacted with hydrochloric acid in dechlorinator 40 and decomposed. The mercury ions in the thus treated brine recirculate through dissolver 44, neutralizer 52, precipitator 58 and brine conduit 64 without being removed from solution and then enter the brine return conduit 36 leading to the electrolytic cells 2.

In another embodiment, the mercury-containing brine from conduit 76 can be treated with at least stoichiometric quantities of hydrogen peroxide to decompose residual sodium hypochlorite. The resulting brine containing dissolved mercury in the form of mercury ions ($Hg^{++}$) is then conveyed through line 76 into the return brine conduit 36 where the brine then enters the electrolytic cell 2.

As a result of this addition, the dissolved mercury ion concentration of the brine stream 36 increases. The brine solution in conduit 36, containing the added dissolved mercury ions, is continued to be passed into the electrolytic cell until its concentration reaches a given level. The exact level will vary depending upon cell operations, e.g. temperature, brine concentration in the cell, current flows through the cell, distance between cathode and anodes, and the like. Thereafter, mercury ions in the brine solution fed to the cell will convert to elemental mercury within the electrolytic cell 2. The elemental mercury falls to the base of the cell and is recovered as part of the flowing mercury cathode 6 which is present in electrolytic cell 2. Of course, some mercuric ions remain below a given concentration in the spent brine and are conducted out of the cell through the brine exit tube 38. However, if such mercury is in the form of mercury ions, they merely continue through the circuit and return to the cell through conduit 64 and conduit 36 in a constant loop. In the event dissolved elemental mercury is present in the brine, this is removed by coprecipitation in precipitator 58 and redissolved into the brine solution as mercuric ions in mercury dissolver 70. From there the dissolved mercury ions are conveyed back to the cell through line 76 and brine return line 36.

The net effect of this process is to dissolve precipitated mercury as mercuric ions into a brine solution, and to introduce the solubilized mercuric values in the form of their mercuric ions back into the brine field for return of these mercuric ions to the electrolytic cell 2 through brine conduit 36. In this manner, the electrolytic cell 2 continuously converts excess mercuric ions which are returned to the electrolytic cell to elemental mercury for recovery as part of the continuous cathode 6.

In the present process an additional modification that was made to avoid sodium sulfide treating large quantities of wash water was to recirculate the wash water in both the head box 10 and tail box 18 which is used to clean the mercury being returned to and leaving the electrolytic cell 2. In the case of the head box 10, the recirculating stream of water is passed through line 12 to a cooler 14 to remove the heat transferred to it by mercury passing through head box 10. A portion of this recirculated water is removed continuously through bleed line 16 and passed into line 84 where it is fed to the decomposer 82. This bleed line is utilized to prevent mercury from accumulating in the circulating water stream in conduit 12 and in head box 10 and thereby keep the mercury content of the water therein at low levels. The mercury which is present in bleed line 16 is recovered in decomposer 82 and returned to the cell 2 through mercury return line 78. Any mercury that exits from decomposer 82 in the caustic solution passing through conduit 94 is removed in filter 96. Mercury and other impurities are separated from filter 96 through line 100 and then passed to a precipitator 26 to separate mercury values as mercuric sulfide. The water stream which is recycled in head box 10 can be returned directly through line 16 to the decomposer 82 because it contains only mercury acquired from contacting the mercury in return line 78. This aqueous solution does not contain any salt or iron values and therefore can be fed directly to the decomposer 82 without contaminating the resulting caustic solution therefrom.

The water stream passing through the tail box 18, presents an entirely different situation. This water circulates through tail box 18 via line 20 and passes through a cooler 22 to remove the heat transferred to it by mercury passing through tail box 18. The water in tail box 18 becomes contaminated with impurities such as salt or iron which are washed from the mercury passing through tail box 18. The salt impurity is derived from the brine that is retained on the mercury. The iron impurity accumulates in the flowing mercury cathode 6 as it contacts iron equipment in the electrolytic cell 2 and conduits during its cycle through the plant. This wash water cannot be fed to the decomposer 82 because it would contaminate the caustic solution therefrom with salt and iron.

A continuous purge stream is bled from the water circulating in conduit 20 through line 24 and passed to precipitator 26. Filter washings also enter precipitator 26 from conduit 100. Sodium sulfide is added through line 30 to the precipitator 26 and is used to precipitate both mercuric sulfide and iron sulfide in the precipitator 26. A mercuric sulfide and iron sulfide precipitate is removed through conduit 28 and precipitator 26, while a salt-containing effluent is removed through line 32 and sewered.

The recirculation of the water in head box 10 and tail box 18 and the treatment of only bleed water which is removed from the tail box 18 with sodium sulfide, reduces substantially the total amount of effluent water which must be treated to remove mercury.

In accordance wih an embodiment of the present invention, the HgS precipitate from precipitator 26 may be conveyed through line 34 to holding tank 66 which contains the precipitate obtained after purifying the reconstituted brine solution recovered from the dissolver 44. In this way all mercury precipitates in the process can be treated in mercury dissolver 70 to solubilize the mercury values and to introduce the mercury ions into the electrolytic cell 2 along with purified brine from conduit 36. Obviously, the mercuric sulfide precipitate from separator 26 may be treated separately with an aqueous hypochlorite solution to solubilize mercury values for return to the electrolytic cell. However, the above constitutes a simplified process for treating all of the precipitated mercury salts in a single stage.

The above described process has many advantages over known methods of treating mercury precipitates. Initially, complete elimination of roasting and other mercury recovery steps is achieved. Further, it obviates the need for holding tanks to treat large volumes of waste water with sodium sulfide to remove and precipitate mercuric sulfide. Only two exit streams need be treated with sodium sulfide in precipitator 26 in accordance with the present invention. One is the bleed stream from the tail box where water, which is in constant contact with exiting mercury from the electrolytic cell 2, is bled from a circulating water washing cycle to prevent both mercury, salt and iron buildup in the water circulating in tail box 18. The second stream is the filter washings from filter 96 which are conveyed through conduit 100 to precipitator 26.

During normal operation of a mercury cell, impurities accumulate on the floor of the cell and form a sludge. This sludge hinders maintaining a uniform mercury level and mercury flow over the surface of the cell floor and must be removed. This is done by periodically taking the cell out of service and water washing the cell floor. The water washings from this step contain much iron and mercury and are best treated by passing such washings, periodically, into precipitator 26, by means not shown, to remove the mercury and iron values before sewering these washings.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing chlorine and caustic soda by electrolyzing a brine stream flowing through an electrochemical cell wherein;
    (a) said brine stream is first purified to remove impurities by adding a member selected from the group consisting of sodium carbonate and barium carbonate to precipitate impurities therefrom,
    (b) the purified brine stream from (a) is passed into an electrochemical cell in which a moving layer of mercury is used as the cathode,
    (c) chlorine gas is produced and recovered as one product and a sodium-mercury amalgam is formed within said electrochemical cell,
    (d) the moving layer of mercury and said sodium-mercury amalgam from (c) is removed from said electrochemical cell and passed into a decomposer where said sodium-mercury amalgam is decomposed in the presence of water to form mercury, hydrogen gas and a caustic soda solution,
    (e) said mercury from (d) is returned to said electrochemical cell, and
    (f) said caustic soda solution from (d) is contacted with a filter to remove impurities and provide a purified caustic soda solution as a second product, the improvement which comprises treating said impurities in (a) with an aqueous extracting solution containing hypochlorite ions in amounts sufficient to selectively solubilize mercury values therein, separating the extract containing solubilized mercury values from the insolubles, introducing said extract into said electrochemical cell along with said purified brine stream in (b), and removing from said electrochemical cell a depleted brine having a lower amount of solubilized mercury values than the brine entering said electrochemical cell.

2. The process of claim 1 wherein said extracting solution is brine containing hypochlorite values and has a pH of at least 7.

3. The process of claim 2 wherein said extracting solution is brine containing hypochlorite values and has a pH of 9 to 12.

4. Process of claim 2 wherein said extracting solution, after an initial extraction of said impurities in (a) at a pH of at elast 9, has its pH lowered to from 7 to 8 by adding sufficient chlorine thereto, further extracting said impurities in (a) with said extracting solution at a pH of from 7 to 8, adding sufficient caustic soda to the extraction solution to increase its pH to at least 9, and separating the extract from the remaining insoluble impurities from (a).

5. The process of claim 1 wherein water which is in contact with said moving layer of mercury being returned to said electrolytic cells in (e) and which contains mercury values is fed to said decomposer for recovery of said mercury values.

6. The process of claim 1 wherein water which is in contact with said moving layer of mercury being removed from said electrolytic cells in (d), and which contains mercury values, is contacted with sodium sulfide to precipitate mercury sulfide therefrom, and said mercuric sulfide is recycled and mixed with said impurities precipitated from said brine solution in (a) for recovery of mercury values therefrom.

7. The process of claim 1 wherein water which is in contact with said moving layer of mercury being removed from said electrochemical cell in (d), and which contains mercury values, is contacted with sodium sulfide to precipitate mercury sulfide therefrom, and said mercuric sulfide is treated with an aqueous extracting solution containing hypochlorite ions in amounts sufficient to selectively solubilize mercury values therein, separating the extract containing solubilized mercury values from the insolubles, introducing said extract into said electrochemical cell along with said purified brine stream in (b), and removing from said electrochemical cell a depleted brine having a lower amount of solubilized mercury values than the brine entering said electrochemical cell.

8. Process of claim 5 wherein a portion of said water which contacts and washes said moving layer of mercury being returned to said electrochemical cell in (e) is cooled and recycled for additional washing and only the remaining portion of water is fed to the decomposer.

9. Process of claim 7 wherein a portion of said water which contacts and washes said moving layer of mercury being removed from said electrochemical cell in (d) is cooled and recycled for additional washing and only the remaining portion of water is contacted with sodium sulfide.

References Cited

UNITED STATES PATENTS

| | | | |
|---|---|---|---|
| 3,085,859 | 4/1963 | Scholten et al. | 204—99 X |
| 3,420,757 | 1/1969 | Friemel et al. | 204—99 |
| 3,536,597 | 10/1970 | Yamori et al. | 204—99 |
| 3,600,285 | 8/1971 | Botwick et al. | 204—99 |
| 3,639,118 | 2/1972 | O'Grady | 204—140 X |

FOREIGN PATENTS

| | | | |
|---|---|---|---|
| 595,813 | 4/1960 | Canada | 204—99 |

JOHN H. MACK, Primary Examiner

D. R. VALENTINE, Assistant Examiner

U.S. Cl. X.R.

204—128